United States Patent [19]

Nishimura et al.

[11] Patent Number: 4,691,982
[45] Date of Patent: Sep. 8, 1987

[54] OPTICAL COUPLER

[75] Inventors: Yukuo Nishimura, Sagamihara; Mamoru Miyawaki, Tokyo; Noriyuki Nose, Kawasaki; Takashi Nakagiri, Tokyo, all of Japan

[73] Assignee: Canon Kabushiki Kaisha, Tokyo, Japan

[21] Appl. No.: 709,300

[22] Filed: Mar. 7, 1985

[30] Foreign Application Priority Data

Mar. 10, 1984 [JP] Japan ................................ 59-44829
Mar. 10, 1984 [JP] Japan ................................ 59-44830
Mar. 10, 1984 [JP] Japan ................................ 59-44831

[51] Int. Cl.⁴ .......................... G02B 6/10; G02B 6/34
[52] U.S. Cl. ................................ 350/96.12; 350/96.15; 350/96.19
[58] Field of Search ............. 350/96.12, 96.11, 96.15, 350/96.17, 96.19, 96.34

[56] References Cited

U.S. PATENT DOCUMENTS

| 4,431,263 | 2/1984 | Garito | 350/96.34 |
| 4,482,207 | 11/1984 | Thomas | 350/96.19 |
| 4,531,809 | 7/1985 | Carter et al. | 350/96.19 |

*Primary Examiner*—William L. Sikes
*Assistant Examiner*—Frank González
*Attorney, Agent, or Firm*—Fitzpatrick, Cella, Harper & Scinto

[57] ABSTRACT

An optical coupler of good efficiency can be prepared at a low cost by making an optical waveguide and a grating of the optical coupler of a monomolecular layer or a monomolecular built-up film.

10 Claims, 11 Drawing Figures

OPTICAL COUPLER

BACKGROUND OF THE INVENTION

1. Field of the Invention

This invention relates to an optical coupler, and more particularly to an optical coupler having a grating in an optical waveguide.

2. Description of the Prior Art

With the development of optical integrated circuits, an optical coupler of high accuracy and good efficiency has been keenly desired. However, very fine processing techniques have been required for optical couplers of desired accuracy, and thus there have been problems such as a decrease in yield and a consequent increase in cost.

A description now will be provided of the conventional grating-type optical coupler.

FIG. 3 is a cross-sectional view of the conventional, flat grating-type optical coupler, where numeral 2 is a substrate, which is, for example, a transparent substrate of glass, plastic, or lithium niobate ($LiNbO_3$), or an opaque substrate of silicon or ceramics. An optical guide 1 is provided on the surface of substrate 2 and has a higher refractive index than that of substrate 2. For example, in the case of a substrate of lithium niobate, the optical waveguide 1 having a film thickness of about 0.5 to about 5 $\mu$m can be formed by thermal diffusion of titanium (Ti) on the substrate surface, or in the case of a substrate of glass having a refractive index of 1.5, the optical waveguide 1 having a film thickness of about 0.5 to about 5 $\mu$m can be formed by the sputtering of glass having a refractive index of 1.55 (wavelength: 6328 Å), for example, glass C-7059 (trademark of Corning Glass, U.S.A.) on the substrate surface.

The numeral 6 represents gratings usually at a pitch of 0.3 to 1 $\mu$m in a depth of 0.1 to 0.2 $\mu$m. When an incident light enters 3 an optical coupler of said structure, light 4 propagates through the waveguide by total reflection, and outgoing light 5 as diffracted by the gratings 6 can be obtained.

In that case, it is generally difficult to prepare gratings, and the preparation of a flat type grating is more difficult than that of a relief type. To effectively attain the function of a gratings 6, gratings of complete rectangular form are preferable, but it is generally not realizable to obtain such gratings of complete rectangular form.

SUMMARY OF THE INVENTION

An object of the present invention is to provide an optical coupler which can be readily prepared at a low cost without the problems of the prior art.

Another object of the present invention is to provide an optical coupler of high accuracy and good efficiency.

Further object of the present invention is to provide an optical coupler having flat type gratings so as to realize structure other structural members (e.g., buffer) which is difficult to form on the relief type gratings, as will be described later.

The present invention is based on formation of a built-up monomolecular film by building up monomolecular layers as will be described below, and further provides an improvement in the formation of gratings.

DESCRIPTION OF THE PREFERRED EMBODIMENTS

Figure 1:
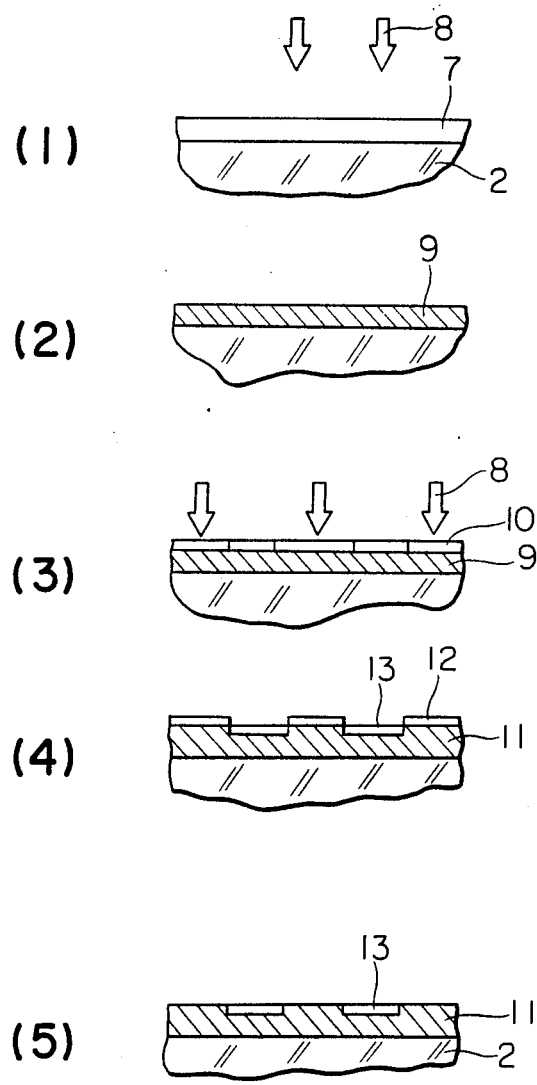
FIG. 1(1)–(5) shows steps for forming flat type gratings according to the present invention.

Description will be made below of a method for building up monomolecular layers as a basis for the present invention and also of the built-up monomolecular film formed thereby.

The method for building up a monomolecular layer is a method for forming an ultra-thin film by forming a monomolecular layer on a water surface, transferring the layer onto a substrate surface, and placing the layers one upon another. This method is called a Langmuir-Blodgett's (LB) method which is named after its inventors. The monomolecular layer refers to a uniform layer having a thickness of one molecule, and the built-up film refers to a film built-up by placing the monomolecular layers one upon another.

The molecules which constitute the monomolecular layer and the built-up film must have at least a hydrophobic moiety and a hydrophilic moiety together within the same chemical structure. Most typical of the hydrophobic moiety are long chain alkyl groups generally having about 5 to about 30 carbon atoms, preferably about 10 to about 25 carbon atoms. So long as the alkyl chain length is appropriate, both linear alkyl group and branched alkyl groups can be applicable. The groups which constitute the other hydrophobic moiety include, for example, olefinic hydrocarbon groups such as vinylene, vinylidene, actylene, etc.; condensed polycyclic phenyl groups such as phenyl, naphthyl, anthranyl, etc.; linear polycyclic phenyl groups such as biphenyl, terphenyl, etc. above or in combinations or as located at the terminal or the intermediate position of the said alkyl group. Most typical of the hydrophilic moiety are carboxyl group and its metal and amine salts, sulfonic acid group and its metal and amine salts, sulfonamide group, amido group, amino group, imino group, hydroxyl group, quaternary amino group, hydroxyamino group, hydroxyimino group, diazonium group, guanidino group, hydrozino group, phosphate group, silicate group, aluminate group, etc. Any combination of the hydrophobic moiety and the hydrophilic moiety cannot alway produce a monomolecular layer and a built-up film. To form a monomolecular layer and a built-up film according to the method for building up monomolecular layers, a monomolecular layer must be formed at first on a water surface on the preparatory grounds as will be described later, and, if the hydrophilic property of molecules is stronger than the hydrophobic property, the molecules will dissolve in water to form an aqueous solution of it, whereas if the hydrophobic property is stronger to the contrary, there will be two discrete phases. A monomolecular layer can be formed on a water surface only when the hydrophobic property and the hydrophilic property are in an appropriate balance. In that case, molecules neither float nor sink on the whole, and the hydrophilic moiety of the molecules is oriented to the water phase and adsorbed on the gas-liquid boundary surface to form a monomolecular layer. Thus, molecules which constitute a monomolecular layer and a built-up film must be in an appropriate balance of the hydrophilic moiety and the hydrophobic moiety.

Now, description will be made below of an apparatus and a method for preparing an LB film, referring to FIGS. 4(A) and (B), where the LB film refers to a monomolecular film and a built-up film prepared according to a method for building up monomolecular films.

Figure 4A:
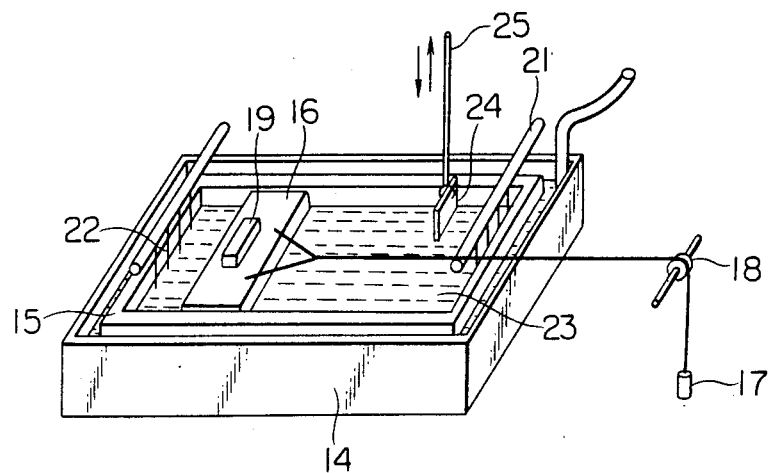
FIGS. 4(A) and (B) are a perspective view and a cross-sectional view of an apparatus for forming an LB film, respectively.
Figure 4B:
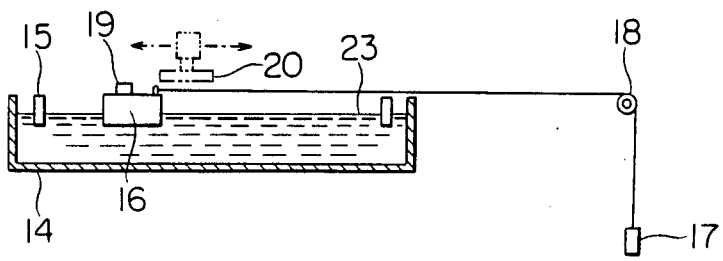

The apparatus for preparing an LB film shown in FIGS. 4(A) and (B) is the one proposed by Kuhn and his research group on the basis of the principle of the Langmuir-Blodgett's (LB) method.

In a shallow and broad rectangular water vat 14, a polypropylene frame 15 is horizontally suspended to partition water surface 23. The frame 15 can act as a two-dimensional cylinder as will be described later. Inside the frame 15, a polypropylene float 16 is provided. The float 16 has a width a little smaller than the inner width of frame 15 and can smoothly move forward or backward as a two-dimensional piston. To pull the float 16 forward, i.e. toward the right side in the drawing, a weight 17 is connected thereto through a pulley 18. To stop the movement of float 16 or push it backward, i.e. toward the left side in the drawing, the repulsive force of a magnet is usually utilized. For this purpose, a magnet 19 is provided as fixed on the float 16 and a countermagnet 20 is provided as movable forward or backward. That is, to push the float 16 backward, the countermagnet 20 is approached to the magnet 19 to develop a repulsive force therebetween, and the float 16 is pushed backward.

The float 16 can be also moved directly forward or backward by means of a rotating motor or a pulley in place of the weight or magnet 19 and countermagnet 20. Suction nozzles 22 at both ends of the frame 15 are connected to a suction pump (not shown in the drawing) through suction pipes 21, respectively. In building up monomolecular layers, clean pure water is used to prevent contamination of the impurities into the monomolecular layer and the built-up film. To clean water surface 23 or promptly remove an unwanted monomolecular layer, the suction pump (not shown in the drawing) and suction nozzles 22 are utilized. In that case, the unwanted monomolecular layer, etc. are swept up by the float 16 and rapidly removed through the suction nozzles 22 to clean the water surface 23.

The float 16 is moved to the left end on the cleaned water surface 23, and a few drops of a solution of a thin layer-forming compound dissolved in a volatile solvent such as benzene, chloroform, etc. at a concentration of up to $5 \times 10^{-3}$ mol/l are added to the water surface. A monomolecular layer remains on the water surface 23 after evaporation of the solvent, showing a two-dimensional behavior on the water surface 23. When the surface density of molecules is low, the monomolecular layer is called a two-dimensional gaseous layer, and an equation of state of two-dimensional ideal gas is established between the area occupied by one molecule and the surface pressure. The occupied area and the surface pressure are automatically and continuously measured by meters (not shown in the drawing). The occupied area and its changing rate can be determined from the forward or backward movement of float 16. The surface pressure can be determined by any of the following specifically featured meters, for example, a meter utilizing indirect measurement of difference in surface tension between the pure water surface and the monomolecular layer coated water surface, and a meter utilizing direct measurement of a two-dimensional pressure on the float 16 provided so as to partition the pure water surface from the monomolecular layer surface. In the state of a gaseous layer, the float 16 is slowly moved forward, i.e. toward the right side in the drawing to gradually reduce the extension of monomolecular layer-coated water surface and to increase the surface density. Then, the intermolecular action is intensified and the gaseous layer is converted to a two-dimensional solid layer through a two-dimensional liquid layer. In the solid layer, the molecules are arranged in uniform orientation, and ultimately the solid layer has a high orderliness and a uniform ultra-thinness as required for optical materials. At this stage, the monomolecular layer can be transferred onto the surface of clean substrate 24 (for example, a substrate of glass, ceramics, plastic, or metal) while keeping the solid layer state. Furthermore, any desired number of the monomolecular layers can be further built up on the monomolecular layer thus transferred onto the substrate 24.

Generally, the surface pressure of a monomolecular layer suitable for the building-up operation is in a range of 15 to 30 dyne/cm. Beyond that range, the arrangement, orientation and orderliness of molecules are disturbed, causing inconveniences such as peeling of the layer, etc. In a special case, an appropriate surface pressure may be beyond the said range, depending on the chemical structure of layer forming compound, temperature condition, etc., and thus the said range should be regarded as a desirable standard. To maintain a constant surface pressure selected from the range of conditions suitable for the building-up operation of monomolecular layers, a means for driving the countermagnet 20 forward or backward (not shown in the drawing) is controlled by a surface pressure controller (not shown in the drawing). For example, when the monomolecular layer is transferred onto the substrate 24 by the building-up operation, the surface pressure is consequently lowered. Thus, the countermagnet 20 is moved, that is, the float 16 is moved to reduce the layer surface area to make up for the reduction in the surface pressure and maintain the specific surface pressure. These operations are automatically carried out.

Figure 5A:
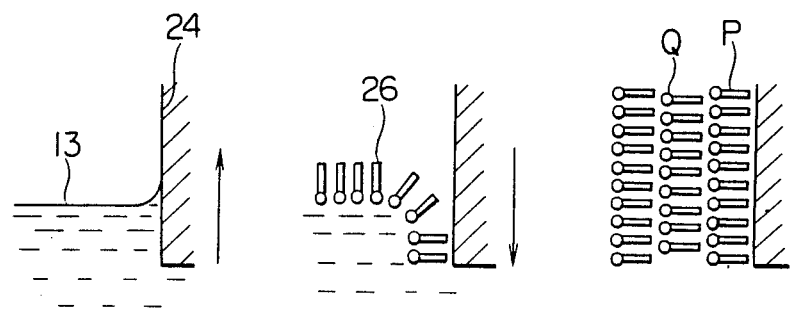
FIGS. 5(A), (B) and (C) show three types of LB film structure.
Figure 5B:
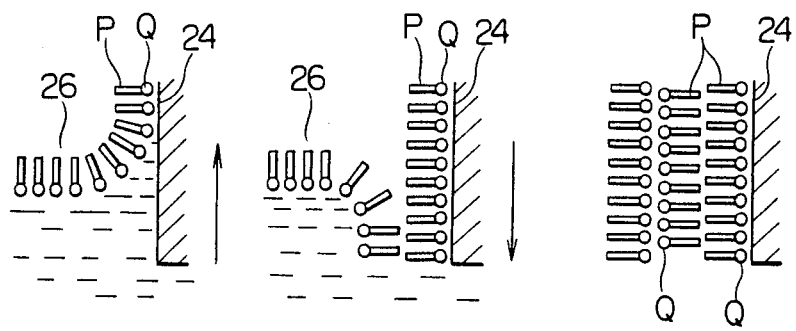
Figure 5C:
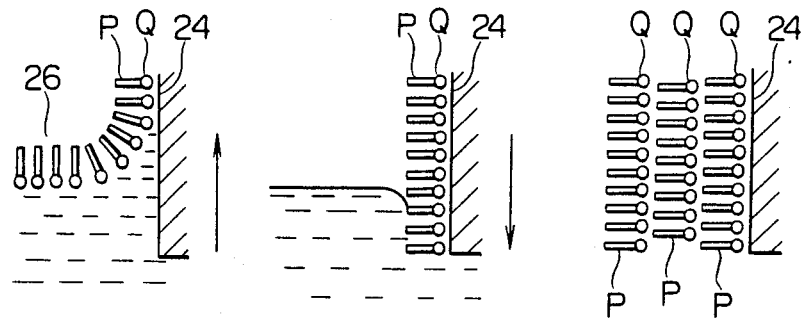

Monomolecular layer 26 (FIG. 5) can be transferred onto the surface of substrate 24 from the water surface 23 according to two major procedures. One is a vertical dipping procedure, and another is a horizontal deposition procedure. According to the vertical dipping procedure, the monomolecular layer 26 can be transferred by moving the substrate 24 in a layer-traversing direction, that is, a vertical direction, while applying a constant surface pressure suitable for the building-up operation to the monomolecular film 26 on the water surface 23. According to the horizontal deposition procedure, a substrate approaches the water surface 23 as much as possible from the overhead while keeping the substrate horizontally, and then slightly tilted to allow it to contact the monomolecular layer 26 at one end and undergo deposition. The procedures have their own specific applicabilities. In the case of the vertical dipping procedure, three kinds of film structure, as shown in FIG. 5, can be obtained, depending on layer-forming molecules and layer-forming conditions. That is, there are type X where the layer can be transferred only when the substrate is dipped, as shown in FIG. 5(A), type Y where the layer can be transferred both when the substrate is dipped and when it is pulled upward, as shown in FIG. 5(B), type Z where the film can be transferred only when the substrate is pulled upward as shown in FIG. 5(C), etc.

Thus, in the type X, the molecules are deposited while orienting the hydrophobic moiety P to the surface of substrate 24 and the hydrophilic moiety Q to the outside. In the type Z, the molecules are deposited while orienting the hydrophilic moiety Q to the surface of substrate 24 and the hydrophobic moiety P to the outside.

In the case of the horizontal deposition procedure, on the other hand, only a built-up film of type X is formed, but the built-up film of type X having a distinguished building-up ratio, as will be described later, can be more simply prepared than in the case of the vertical dipping procedure. Furthermore, the horizontal deposition procedure is suitable for preparing a protein monomolecular film.

Using any known procedure, the surface of substrate 24 must be thoroughly cleaned in the sense of surface chemistry. If cleaning of the surface of substrate 24 is not satisfactory, the transferred layer will be peeled off, and it will be difficult to prepare a built-up film.

The surface of glass substrate can be made completely hydrophilic, for example, by dipping the substrate in a chromic acid mixture, washing the substrate with distilled water, and then drying it in a clean air stream.

The surface of a substrate can be completely hydrophobic, for example, by thoroughly smearing the cleaned surface of the substrate with molten iron (III) stearate, strongly and thoroughly rubbing off the stearate with clean cloth such as a cotton gauze, thereby forming a monomolecular layer of iron (III) stearate with the hydrophilic groups oriented toward the substrate surface.

Figure 6A:
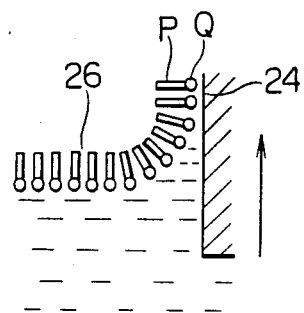
FIGS. 6(A), (B) and (C) show formation of LB film.

Description will be made below of operations to form a built-up film of type Y according to the vertical dipping procedure, referring to FIG. 6 to more specifically explain the building-up operations. Illustrated embodiment (FIG. 6) concerns the case of hydrophilic substrate 24. The first monomolecular layer 26 is transferred onto the hydrophilic substrate 24 during the pulling-upward step, as shown in FIG. 6(A). Thus, in the actual operation, the substrate is at first dipped deep in water, and then a dilute solution of a layer-forming compound is dropwise added to the water. Then, the surface pressure is increased up to a suitable value for preparing a transferable layer, and then the substrate 24 is pulled upward. A pulling-upward (pulling-downward) speed suitable for transferring the layer is in a range of 0.1 to 10 cm/min. A suitable speed may be sometimes beyond the said range, depending on layer forming compounds and layer-forming conditions.

In the first pulling-upward step, the first monomolecular layer is transferred while orienting the hydrophilic moiety Q to the surface of substrate 24 and the hydrophobic moiety P to the outside.

Figure 6B:
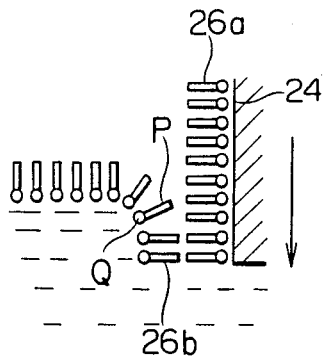
Figure 6C:
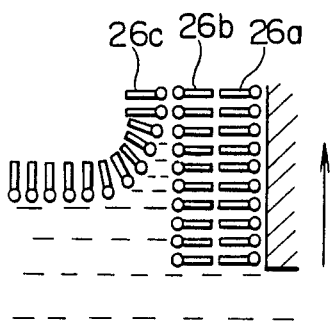

In the successive dipping (pulling-downward) step (FIG. 6(B)), the second monomolecular layer is deposited while orienting the hydrophobic moiety P to the surface of substrate 14 and the hydrophilic moiety Q to the outside. It has been found that, when the second layer 26b is transferred after the deposited first layer 26a is thoroughly dried in air to remove water and other solvent therefrom, building-up operations can proceed better without peeling of the transferred layer. The third layer 26c, and further layers can be deposited by repeating the same operations as above (see FIG. 6(C)) to prepare a built-up film of desired layer number. In the illustrated embodiment, the hydrophilic moiety Q in the odd-numbered layer of type Y film is always oriented to the surface of substrate 24, and the hydrophobic moiety P to the outside.

As a result of many experiments, it has been found that the thickness of a built-up film thus obtained is equal to the length of molecule (10–80 Å) multiplied by number of transfer (number of monomolecular layers). Other factors having an influence on deposition of layers include (1) chemical structure of layer-forming compound, (2) pH of aqueous phase, and kind and concentration of salts contained, (3) temperature, (4) kind of substrate, etc. For example, fatty acid salts can more readily form a stable built-up film than pure linear fatty acids. Particularly, salts of calcium, barium, cadmium, etc. are distinguished. In that case, composition and deposition of a built-up film depend on the pH of aqueous phase. That is, generally a pure fatty acid film can be formed below pH 4, a metal salt film above pH 9, and a built-up film of their mixture at a pH therebetween. To quantitatively designate the deposition of a built-up film, a building-up ratio is used as an index, and defined to be a ratio of a layer area actually transferred from water surface 23 to a predetermined area on a substrate. The layer area transferred from the surface area can be determined by measuring a displacement of float 16. For example, building-up ratio zero means the case where no layer has been transferred at all, and building-up ratio 1 means the case where the layer has been ideally transferred. Generally, metal salts have a higher building-up ratio than free acids.

Substrate 24 for use in the present invention may be any appropriate substrate without any particular restriction to substrate dimension. In the present invention, the thickness of LB film is in a range of 0.5–5 $\mu$m after repetitions of building-up operations as mentioned above. The substance suitable for the present grating-type, optical coupler can be any LB film-forming substance having appropriate optical characteristics. Particularly suitable are, for example, fatty acids, particularly, linear fatty acids having 10–30 carbon atoms (stearic acid, arachidinic acid) and their salts (cadmium salt ), and polymerizable LB films as will be described later.

The refractive index of these substances can be readily controlled by appropriately selecting the length of carbon chain or adding metal ions.

The built-up LB film is subjected to patterning according to the well known means, or to patterning a desired shape according to a novel process for patterning which relates to another patent application (Japanese Patent Application No. 59-28793). The patterned LB film functions as a waveguide.

A process for forming a flat-type grating according to the present invention will be described below, referring to FIG. 1. A photopolymerizable, LB film substance is used to form an LB film of type Y as mentioned before.

A polymerizable LB film 7 is formed on a substrate 2 of glass, ceramics, plastic or silicon oxide by monomolecular layer building-up. To obtain a desired shape of optical coupler, the LB film is then subjected to patterning exposure by light or electrons (FIG. 1(1)), and then the unexposed portions of LB film are removed by development (developing solution: alcohol, chloroform, benzene, etc.) (FIG. 1 (1) and (2)). In that case, the polymerized portions are not dissolved by the developing solution (FIG. 1(2)). Then, another polymerizable LB film 10 is formed on polymerized LB film 9 by monomolecular layer building-up. The polymerizable LB film is preferably the same as the polymerizable LB film 7, but can be other film, so long as it can satisfy the optical requirements.

In that case, if the surface of polymerized LB film 9 (the surface to be in contact with the polymerizable LB film 10) is hydrophilic, it is necessary to adjust the thickness of polymerizable LB film 10 so as to make the surface of polymerizable LB film 10 hydrophilic and if the surface of polymerized LB film 9 is hydrophobic, it is necessary to do so as to make the surface of polymerizable LB film 10 hydrophilic.

As is obvious from the said monomolecular layer building-up, the surface of LB film must be either hydrophilic or hydrophobic, and its adjustment can be much readily made. Said patterning exposure is conducted so that only LB film laid on the surface of LB film 9 of desired shape can remain. Grating pattern exposure is also conducted at the same time, or before or after the said patterning exposure. By developing, a relief pattern of polymerized LB film 11 as shown in FIG. 1(4) can be obtained, where the recessed portions of grating 11 correspond to the surface of polymerized LB film 9, whereas the protruded portions correspond to the surface of LB film 10. That is, the one surface is a hydrophilic surface, whereas the other surface is a hydrophobic surface. Then, LB films 12 and 13 are formed on the polymerized LB film 11 by the said monomolecular layer building-up, where, if the bottoms of recessed portions of polymerized LB film 11 is hydrophilic, the first layer of LB film 13 is formed so that the hydrophilic groups can be oriented to the substrate side. Thus, in the protruded portions, the hydrophobic groups and hydrophilic groups (the first layer of LB film 12) face each other. If the bottoms of the recessed portions of polymerized LB film 11 is hydrophobic to the contrary, the first layer of LB film 13 is formed so that the hydrophobic groups can be oriented to the substrate side. The thickness of LB film 13 is made equal to the depth of grating that is, the surfaces of protruded portions of film 11 is made to be on a level equal to the surface of film 13 (FIG. 1(4)). It is obvious from the feature of monomolecular layer building-up which comprises repetitions of the step of building monomolecular layers one upon another that the thickness of LB film 13 can be more readily adjusted.

Whether LB films 12 and 13 to be laid on the polymerized LB film 11 are polymerizable or not is no problem, but the LB films 12 and 13 must have a smaller refractive index than that of polymerized LB film.

The built-up film having the structure of FIG. 1(4) is dipped in an ultrasonic water vat (not shown in the drawing), and subjected to ultrasonic wave generated under appropriate conditions. Since the hydrophobic groups and hydrophilic groups face each other, peeling (removed) takes place at the contact surface between the LB films 11 and 12 having a weak bonding strength. On the other hand, the hydrophilic groups themselves (or hydrophobic groups themselves) face each other at the contact surface between the LB films 11 and 13, and thus have a relatively strong bonding strength, with the result of no peeling. By the selective peeling (removal), the built-up film having the cross-sectional structure shown in FIG. 1(5) can be formed.

LB films 11 and 13 are formed on the same level, and thus, a flat-type, that is, phase-differential type grating can be constructed. The phase-differential type coupler is useful for constructing other structural members on the grating.

One embodiment of the present invention will be described below, referring to FIG. 2, where an LB film 31 having a flat-type grating is laid on a substrate 32. LB film 33 is provided in recessed grating portions 36 of LB film 31 and the surfaces of LB films 31 and 33 are on the same level to form a flat, that is, phase-differential type grating 36. LB films 31 and 33 have the same surface properties. That is, if the surface of LB film 31 is hydrophilic, the surface of LB film 33 must be also hydrophilic. On the other hand, if the surface of LB film 31 is hydrophobic, the surface of LB film 33 must be also hydrophobic.

LB film 34 is formed on the grating, and the refractive index of LB film 34 must be lower than that of LB film 31. It is preferable that the LB film 34 is made of the same substance as that of LB film 33, or has the refractive index as that of LB film 33. LB film 34 functions as a buffer layer. Reflective layer 35 is provided on the upper surface of LB film (buffer layer) 34, and is made of an Al film by vapor deposition.

Figure 2:
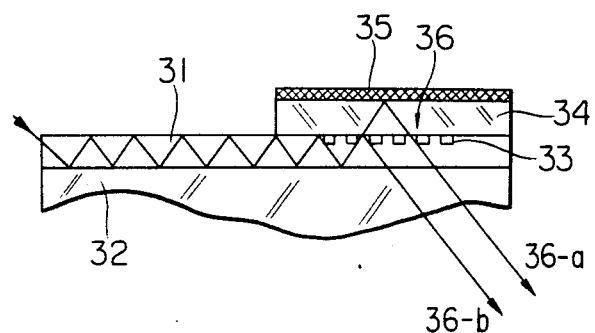
FIG. 2 is a cross-sectional view of an optical coupler according to one embodiment of the present invention.
Figure 3:
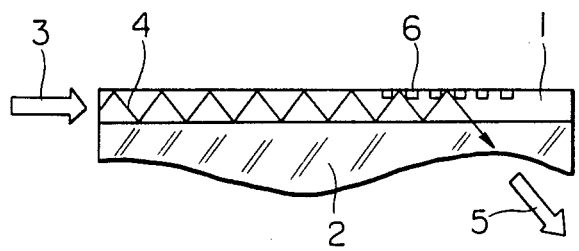
FIG. 3 is a cross-sectional view of the conventional optical coupler.

LB film 34 can be formed all over the LB film 33, or can be selectively formed so as to cover the grating only, as shown in FIG. 2. In the case of a polymerizable LB film, the LB film 34 can be patterned to the desired shape by patterning exposure, or in the case of non-polymerizable LB film, it can be patterned according to a process for forming a pattern, which relates to another patent application (Japanese Patent Application No. 59-28793). It is necessary that the thickness of LB film 34 be set to mutually intensify the light 36-b diffracted by the grating and outgoing directly to the substrate side 32 and light 36-a outgoing to the LB film 34, reflected on the reflective layer 35 and outgoing to the substrate side 32 by interference. In that case, the LB film 34 functions as a buffer layer as mentioned above.

Optimum thickness of LB film 34 for mutually intensifying the outgoing lights 36-a and 36-b by interference can be readily derived according to the well know optical law, but the film thickness must be controlled to less than the wavelength of light. The outgoing lights 36-a and 36-b have different optical path lengths, as shown in FIG. 2. Intensification of light takes place, if the optical path difference is in an integral multiplication of the wavelength.

The present optical coupler having a grating, an optical waveguide and a buffer layer with a reflective layer, made of LB layer, as shown in FIG. 2 can utilize the light outgoing to the reflection side of substrate 32 and thus is effective for improving the light outgoing efficiency. Furthermore, the present invention can provide an optical coupler at a low cost and also an optical coupler having a flat-type grating, which can readily construct a buffer layer.

The present invention will be explained in detail below, referring to Examples.

EXAMPLE 1

A thoroughly clean white glass substrate plate (10 mm × 10 mm × 0.3 mm thick; 81% $SiO_2$, 13% $B_2O_3$, 4% $Na_2O$, and 2% $Al_2O_3$) was dipped in water in a water vat 14 in an apparatus for preparing an LB film. A solution of a diacetylene derivative having the following formula I in chloroform at a concentration of $3\times 10^{-3}$ mol/l was extended on the water surface at pH 6.2 and a cadmium chloride concentration of $1.0\times 10^{-3}$ mol/l.

$$C_{11}H_{23}C\equiv C-C\equiv C-(CH_2)_8COOH \qquad I$$

After removal of the solvent chloroform therefrom the evaporation the surface pressure was elevated up to 20 dyne/cm.

The substrate having the thoroughly clean and hydrophilic surface was gently and vertically moved at a vertically moving speed of 1.0 cm/min in a water surface-traversing direction, while keeping the surface pressure constant, whereby the diacetylene monomolecular layer was transferred to the substrate and these operations were repeated until the built-up film 9 on the substrate had a thickness of about 0.9 μ. In that case, the final building-up was conducted in a state that the hydrophilic groups were oriented to the surface side so that the surface of LB film 9 could be hydrophilic.

Then, the built-up LB film 9 was exposed to ultraviolet beams to initiate polymerization. Thus, a polydiacetylene LB film was obtained.

Furthermore, a monomolecular film of said diacetylene derivative was formed on the LB film a by building-up in the same manner as above until the built-up film 10 had a thickness of 0.1 μm. In that case, the final building-up was conducted in a state that the hydrophobic groups could be oriented to the surface side so that the surface of LB film 10 could be hydrophobic.

Then, a grating pattern at a pitch of 200 Å was tightly laid on the LB film 10, and the LB film 10 was exposed to ultraviolet beams. Then, the substrate was dipped in a chloroform solution to dissolve the unexposed portions. Thus, a polymerized LB film 11 was formed.

Then, a monomolecular film of stearic acid was built-up on the polymerized LB film by building-up in the same manner as above until the films 12 and 13 had a thickness of 0.1 μm. Then, the substrate was dipped in water and subjected to ultrasonic washing to remove the built-up film 12 of stearic acid in the protruded portions in the polymerized LB film 11. The structure shown in FIG. 1(5) was thus obtained.

A high light outgoing efficiency was shown when He-Ne laser (6328 Å) and semiconductor laser (8300 Å) were let in the thus obtained optical coupler as laser beams.

EXAMPLE 2

Structure as shown in FIG. 1(5) was prepared in the same manner and under the same conditions as in Example 1 except that a photopolymerizable olefinic compound having the following formula II was used as substance for LB films 9 and 10.

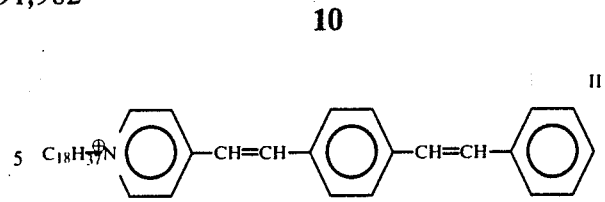

The desired object could be attained when the He-Ne laser and the semiconductor layser were let in the thus obtained optical coupler as laser beams.

EXAMPLE 3

Structure as shown in FIG. 1(5) was prepared in the same manner and under the same conditions as in Example 1 except that a mixture of one part by weight of the diacetylene derivative having the formula I and one part by weight of the photopolymerizable olefinic compound having the formula II was used as substance for LB films 9 and 10.

The desired object could be attained when the He-Ne laser and the semiconductor laser were let in the thus obtained optical coupler as laser beams.

What is claimed is:

1. An optical coupler which comprises an optical waveguide with a flat grating included therein, and a substrate on which the waveguide is formed, the optical waveguide being comprised of a film of an organic compound having both a hydrophobic moiety and a hydrophilic moiety, and the grating being comprised of a film having a different refractive index from that of the optical waveguide.

2. An optical coupler according to claim 1, wherein a buffer layer is provided on the optical waveguide and a reflective layer is provided on an upper surface of the buffer layer.

3. An optical coupler according to claim 2, wherein the buffer layer is made of an LB film.

4. An optical coupler according to claim 1, wherein the substrate is made of at least one of glass, ceramics, plastic, and silicon oxide.

5. An optical coupler according to claim 2, wherein the reflective layer is an Al vapor-deposited substrate.

6. An optical coupler according to claim 1, wherein the optical waveguide is made of at least one of a diacetylene derivative and a photopolymerizable olefinic compound.

7. An optical coupler according to claim 1, wherein the optical waveguide has a thickness of 0.5 to 5 μm.

8. An optical coupler according to claim 1, wherein the grating is made of an aliphatic carboxylic acid and its metal salt.

9. An optical coupler according to claim 1, further comprising two hydrophilic groups disposed so as to face each other to form a contact surface between the optical waveguide and the flat grating.

10. An optical coupler according to claim 1, further comprising two hydrophobic groups disposed so as to face each other to form a contact surface between the optical waveguide and the flat grating.

* * * * *